June 9, 1931.  G. BAUER ET AL  1,809,666
SUPPLY CONDUIT FOR STEAM AND GAS TURBINES
Filed Nov. 6, 1930
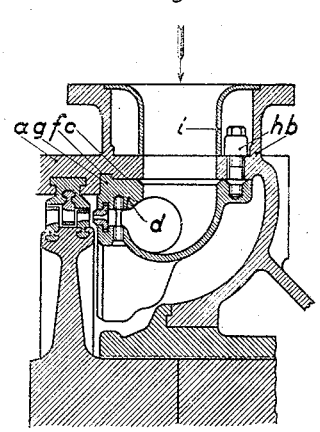
Fig: 2
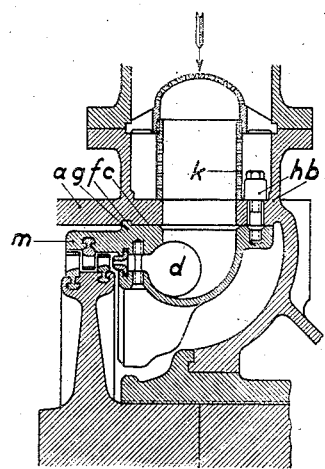
Fig: 3
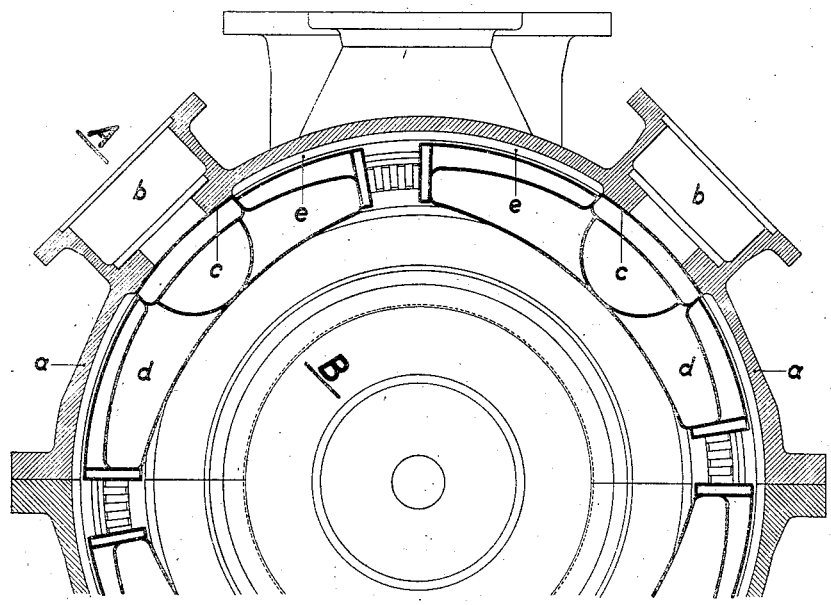
Fig: 1
Inventors,
Gustav Bauer
Carl Schmieske
By Clair W. Fairbank Atty.

Patented June 9, 1931

1,809,666

UNITED STATES PATENT OFFICE

GUSTAV BAUER, OF HAMBURG, AND CARL SCHMIESKE, OF BREMEN, GERMANY

SUPPLY CONDUIT FOR STEAM AND GAS TURBINES

Application filed November 6, 1930, Serial No. 493,839, and in Italy October 30, 1929.

Since super-heated steam usually expands considerably in the first stage of a turbine and thus falls considerably in pressure and temperature it is always attempted to make the contact surface between the incoming hot steam or the hot steam conduit and the turbine casing as small as possible because the great temperature difference between the steam conduit and the turbine casing produces stresses in the material which often lead to cracks. For the same reasons it is also not advisable to conduct the fresh steam through annular conduits cast in the casing since these conduits must then take the temperature of the incoming steam whereby stresses in the material with respect to other cooler parts of the casing are produced which may very easily cause damage.

According to the invention to overcome the above mentioned disadvantage the supply conduits leading to the nozzle casing arranged in the known manner in the turbine casing is so arranged that the contact and sealing places between the fresh steam or gas supply conduit and the nozzle casing is reduced to a very small size. This sealing surface is at the same time so arranged that it can be formed in the most convenient manner in the lathe. The nozzle casing is held in the axial direction by a concentric groove and rib connection.

The accompanying drawings show two examples of steam turbine embodying the invention.

Figure 1 is a vertical section through the nozzle casing, turbine casing and steam conduit.

Figures 2 and 3 are cross-sections taken on the line A—B of Figure 1 of two different examples.

The steam supply connections $b$ on the casing $a$ are so constructed that they only bear with small cylindrical surfaces which can be made on the lathe against the nozzle casing $d$, these surfaces acting as contact and sealing surfaces. The sealing surfaces $c$ project slightly inwardly so that an intermediate space $e$ is left between the casing $a$ and the nozzle casing $d$, which permits free expansion of the walls of the casing and the nozzle casing. Axial displacement of the nozzle casing is prevented by a concentric groove and rib connection $f$, $g$, with the casing.

Pressing of the sealing surfaces is effected by bolts or screws $h$ which can be tightened from outside the casing. In order that the nuts or screws may be kept out of the current of steam or gas and prevented from falling into the nozzle casing, they are arranged outside an inset piece $i$ inserted in the connection $b$. This inset piece also protects the surrounding casing wall against the harmful effects of the flowing highly heated steam or gas. Further it is formed, as the example in Figure 2 shows, so that efficient flow of steam or gas is obtained. According to Figure 3 it can be constructed as a steam strainer $k$ of known kind.

According to Figure 3 the nozzle casing simultaneously forms the guide plate carrier $m$, in known manner.

What we claim is:—

1. A turbine including a main casing and having an opening leading into the interior of said casing, a motive fluid supply connection on said casing and registering with said opening and larger than the latter, a removable tubular member within said connection and having a passage aligned with said opening, and having the peripheral wall thereof spaced from the wall of said connection, said tubular member being provided with a flange at the inlet end, and extending to the wall of said conduit so as to leave an annular space, a nozzle casing disposed entirely in said main casing, and securing members connecting said nozzle casing to said main casing, and having portions thereof extending into said space, whereby said securing members are protected from the stream of motive fluid.

2. A turbine including a main casing having an opening leading into the interior thereof, a motive fluid supply connection on said casing and registering with said opening, a steam strainer disposed in said connection and having the wall thereof spaced from the wall of said connection, a nozzle casing disposed entirely within said main casing, and bolts connecting said nozzle casing to said main casing, said bolts extending between said steam strainer and said connection, whereby said bolts are out of the path of the supply stream of motive fluid.

3. A turbine including a main casing having a radially extending inlet opening on the periphery thereof, the peripheral wall of said casing being provided with a radially inwardly facing annular seat surrounding said opening, a nozzle casing disposed entirely inside said main casing, and having an inlet registering with said opening, said nozzle casing having a portion encircling said inlet, and in surface contact with said seat, and means accessible from the exterior of said main casing and projecting through the wall thereof for securing said nozzle casing in position.

In testimony whereof we have signed our names to this specification.

GUSTAV BAUER.
CARL SCHMIESKE.